(12) United States Patent
Burshtain et al.

(10) Patent No.: US 10,199,646 B2
(45) Date of Patent: Feb. 5, 2019

(54) ANODES FOR LITHIUM-ION DEVICES

(71) Applicant: StoreDot Ltd., Herzeliya (IL)

(72) Inventors: Doron Burshtain, Herzliya (IL); Liron Amir, Ramut Gan (IL); Daniel Aronov, Netanya (IL); Olga Guchok, Ramat Gan (IL); Leonid Krasovitsky, Rishon LeTzion (IL)

(73) Assignee: StoreDot Ltd., Herzeliya (IL)

( * ) Notice: Subject to any disclaimer, the term of this patent is extended or adjusted under 35 U.S.C. 154(b) by 52 days.

(21) Appl. No.: 15/479,455

(22) Filed: Apr. 5, 2017

(65) Prior Publication Data

US 2017/0207451 A1   Jul. 20, 2017

Related U.S. Application Data

(63) Continuation-in-part of application No. 14/813,499, filed on Jul. 30, 2015, now abandoned.

(Continued)

(51) Int. Cl.
*H01M 4/36* (2006.01)
*H01M 4/587* (2010.01)
(Continued)

(52) U.S. Cl.
CPC ............ *H01M 4/366* (2013.01); *H01G 11/06* (2013.01); *H01G 11/30* (2013.01); *H01G 11/36* (2013.01);
(Continued)

(58) Field of Classification Search
CPC ........... H01M 10/052; H01M 10/0525; H01M 2004/027; H01M 4/13; H01M 4/364;
(Continued)

(56) References Cited

U.S. PATENT DOCUMENTS

| | | |
|---|---|---|
| 3,778,254 A | 12/1973 | Cole et al. |
| 6,051,340 A | 4/2000 | Kawakami |

(Continued)

FOREIGN PATENT DOCUMENTS

| | | |
|---|---|---|
| CA | 2161076 | 4/1996 |
| CA | 2258026 | 12/1997 |

(Continued)

OTHER PUBLICATIONS

X. Chen, X. Li, F. Ding, W. Xu, J. Xiao, Y. Cao, P. M., J. Liu, G. L. Graff, J.-G. Zhang. Conductive Rigid Skeleton Supported Silicon as High-Performance Li-Ion Battery Anodes, Nano Lett. 2012, 12, 4124-4130.*

(Continued)

*Primary Examiner* — Carlos Barcena
(74) *Attorney, Agent, or Firm* — Pearl Cohen Zedek Latzer Baratz LLP (57) ABSTRACT

An anode material for a lithium ion device includes an active material including silicon nanoparticles and boron carbide nanoparticles. The boron carbide nanoparticles are at least one order of magnitude smaller than the silicon nanoparticles. The weight percentage of the silicon is between about 4 to 35 weight % of the total weight of the anode material and the weight percentage of the boron carbide is between about 2.5 to about 25.6% of the total weight of the anode material. The active material may include carbon at a weight percentage of between 5 to about 60 weight % of the total weight of the anode material. Additional materials, methods of making and devices are taught.

20 Claims, 9 Drawing Sheets

Related U.S. Application Data (60) Provisional application No. 62/030,622, filed on Jul. 30, 2014.

(51) Int. Cl.

| | | |
|---|---|---|
| *H01M 4/38* | (2006.01) | |
| *H01M 10/0525* | (2010.01) | |
| *H01G 11/86* | (2013.01) | |
| *H01G 11/06* | (2013.01) | |
| *H01G 11/36* | (2013.01) | |
| *H01G 11/46* | (2013.01) | |
| *H01G 11/50* | (2013.01) | |
| *H01G 11/30* | (2013.01) | |
| *H01M 4/13* | (2010.01) | |
| *H01M 4/58* | (2010.01) | |
| *H01M 10/052* | (2010.01) | |
| *H01M 4/02* | (2006.01) | |
| *B82Y 30/00* | (2011.01) | |
| *H01G 11/56* | (2013.01) | |
| *H01M 4/62* | (2006.01) | |

(52) U.S. Cl.
CPC .............. *H01G 11/46* (2013.01); *H01G 11/50* (2013.01); *H01G 11/86* (2013.01); *H01M 4/13* (2013.01); *H01M 4/364* (2013.01); *H01M 4/386* (2013.01); *H01M 4/58* (2013.01); *H01M 4/587* (2013.01); *H01M 10/052* (2013.01); *H01M 10/0525* (2013.01); *B82Y 30/00* (2013.01); *H01G 11/56* (2013.01); *H01M 4/625* (2013.01); *H01M 2004/027* (2013.01); *Y02E 60/13* (2013.01)

(58) Field of Classification Search
CPC ........ H01M 4/366; H01M 4/386; H01M 4/58; H01M 4/587; H01M 4/625
See application file for complete search history.

(56) References Cited

U.S. PATENT DOCUMENTS

| | | | |
|---|---|---|---|
| 6,492,061 | B1 | 12/2002 | Gauthier et al. |
| 6,541,156 | B1 | 4/2003 | Fuse et al. |
| 6,558,438 | B1 | 5/2003 | Satoh |
| 6,599,662 | B1 | 7/2003 | Chiang et al. |
| 7,192,673 | B1 | 3/2007 | Ikeda et al. |
| 7,906,238 | B2 | 3/2011 | Le |
| 8,021,791 | B1 | 9/2011 | Plichta et al. |
| 8,945,774 | B2 | 2/2015 | Coowar et al. |
| 8,951,673 | B2 | 2/2015 | Wessells et al. |
| 9,406,927 | B1 | 2/2016 | Burshtain et al. |
| 9,472,804 | B2 | 10/2016 | Burshtain et al. |
| 9,583,761 | B2 | 2/2017 | Burshtain et al. |
| 9,728,776 | B2 | 8/2017 | Burshtain et al. |
| 2002/0122980 | A1 | 9/2002 | Fleischer et al. |
| 2002/0146623 | A1 | 10/2002 | Suzuki et al. |
| 2003/0039889 | A1 | 2/2003 | Park et al. |
| 2004/0033360 | A1 | 2/2004 | Armand et al. |
| 2004/0219428 | A1 | 11/2004 | Nagayama |
| 2005/0019659 | A1 | 1/2005 | Shiozaki et al. |
| 2005/0093512 | A1 | 5/2005 | Mader et al. |
| 2007/0003837 | A1 | 1/2007 | Nishimura et al. |
| 2007/0281216 | A1 | 12/2007 | Petrat et al. |
| 2007/0284159 | A1 | 12/2007 | Takami et al. |
| 2008/0248386 | A1 | 10/2008 | Obrovac et al. |
| 2009/0179181 | A1 | 7/2009 | Zhang et al. |
| 2009/0317637 | A1 | 12/2009 | Luhrs et al. |
| 2010/0159331 | A1 | 6/2010 | Lee et al. |
| 2010/0190059 | A1 | 7/2010 | Graetz et al. |
| 2011/0257001 | A1 | 10/2011 | Negishi |
| 2012/0045696 | A1 | 2/2012 | Herle |
| 2012/0088155 | A1 | 4/2012 | Yushin et al. |
| 2012/0164531 | A1 | 6/2012 | Chen et al. |
| 2013/0040226 | A1 | 2/2013 | Yamauchi et al. |
| 2013/0059174 | A1 | 3/2013 | Zhamu |
| 2013/0224594 | A1 | 8/2013 | Yushin et al. |
| 2013/0260285 | A1 | 10/2013 | Yamauchi et al. |
| 2013/0266875 | A1 | 10/2013 | Matsumoto et al. |
| 2014/0004426 | A1 | 1/2014 | Kerlau et al. |
| 2014/0113202 | A1 | 4/2014 | Sun et al. |
| 2014/0295267 | A1 | 10/2014 | Wang |
| 2015/0017515 | A1 | 1/2015 | Jeon et al. |
| 2015/0046110 | A1 | 2/2015 | Joe et al. |
| 2015/0221977 | A1 | 8/2015 | Hallac et al. |
| 2015/0367747 | A1 | 12/2015 | Decker et al. |
| 2016/0036045 | A1 | 2/2016 | Burshtain et al. |
| 2016/0064773 | A1 | 3/2016 | Choi et al. |
| 2016/0104882 | A1 | 4/2016 | Yushin et al. |
| 2016/0149220 | A1 | 5/2016 | Uhm et al. |
| 2016/0264124 | A1 | 9/2016 | Hotta |
| 2017/0012279 | A1 | 1/2017 | Burshtain et al. |
| 2017/0294643 | A1 | 10/2017 | Burshtain et al. |
| 2017/0294644 | A1 | 10/2017 | Burshtain et al. |
| 2017/0294648 | A1 | 10/2017 | Burshtain et al. |
| 2017/0294649 | A1 | 10/2017 | Burshtain et al. |
| 2017/0294687 | A1 | 10/2017 | Burshtain et al. |
| 2018/0050602 | A1 | 2/2018 | Aronov |
| 2018/0108937 | A1 | 4/2018 | Drach et al. |
| 2018/0175634 | A1 | 6/2018 | Aronov |

FOREIGN PATENT DOCUMENTS

| | | |
|---|---|---|
| CN | 101734675 | 6/2010 |
| CN | 104577081 | 4/2015 |
| EP | 1999818 | 12/2008 |
| EP | 2889097 | 7/2015 |
| JP | 2002/056891 | 2/2002 |
| JP | 2006/216276 | 8/2006 |
| JP | 2007/323837 | 12/2007 |
| JP | 2008-053092 | 3/2008 |
| JP | 2012/131674 | 7/2012 |
| JP | 2014-002834 | 1/2014 |
| KR | 2012/0121265 | 11/2012 |
| WO | WO 2013/040356 | 3/2013 |
| WO | WO 2014/068036 | 5/2014 |
| WO | WO 2015/016563 | 7/2014 |
| WO | WO 2016/031082 | 3/2016 |

OTHER PUBLICATIONS

U.S. Appl. No. 15/447,784, filed Mar. 2, 2017, Burshtain et al.
U.S. Appl. No. 15/447,889, filed Mar. 2, 2017, Burshtain et al.
U.S. Appl. No. 15/678,143, filed Aug. 16, 2017, Aronov et al.
U.S. Appl. No. 62/482,450, filed Apr. 6, 2017, Drach et al.
Office action of U.S. Appl. No. 15/582,066 dated Aug. 21, 2017.
Office action of U.S. Appl. No. 15/447,784 dated Oct. 19, 2017.
Office action of U.S. Appl. No. 15/480,888 dated Sep. 13, 2017.
E. McRae and J.F. Mareche "Stage dependence of the electrical resistivity of graphite intercalation compounds", Journal of Physics C: Solid State Physics, vol. 18, No. 8 , Apr. 5, 1983, pp. 1627-1640, Lab. de Chimie du Solide Miner., Nancy Univ., Vandoeuvre, France.
Takatoshi Kasukabe et al. "Beads-Milling of Waste Si Sawdust into High-Performance Nanoflakes for Lithium-Ion Batteries", Sci Rep. 2017; 7: 42734. Published online Feb. 20, 2017.
Yongxin An et al. "Effects of VC-LiBOB binary additives on SEI formation in ionic liquid-organic composite electrolyte", RSC Advances, 2012, 2, Received Nov. 6, 2011, Accepted Feb. 21, 2012, pp. 4097-4102.
Aaron M. Chockla "Tin-Seeded Silicon Nanowires for High Capacity Li-Ion Batteries", Department of Chemical Engineering, Texas Materials Institute, Center for Nano- and Molecular Science and Technology,The University of Texas at Austin, Austin, Texas 78712-1062, United States, pp. 3738-3745, Published: Sep. 11, 2012.
Yong-Mao Lin et al "High performance silicon nanoparticle anode in fluoroethylene carbonate-based electrolyte for Li-ion batteriesw" Chem. Commun., 2012, 48, Received Mar. 7, 2012, Accepted May 28, 2012, pp. 7268-7270.
Rosa Martel Danoary Tsirinomeny, "Contribution to the Ultra-Fast Charging of Electric Vehicles: The Configurable Modular Multi- (56) References Cited

OTHER PUBLICATIONS level Converter (CMMC)", Mots-clés de l'auteur: Ultra-fast; lithium-titanate; UFCEV; CMMC; Flex-EV. Mar. 4, 2016.
U.S. Appl. No. 15/792,779, filed Oct. 25, 2017, Jacob et al.
U.S. Appl. No. 15/853,885, filed Dec. 25, 2017, Jacob et al.
U.S. Appl. No. 15/935,006, filed Mar. 25, 2018, Aronov.
U.S. Appl. No. 16/013,969, filed Jun. 21, 2018, Burshtain et al.
U.S. Office Action for U.S. Appl. No. 15/447,784, dated Dec. 28, 2017.
U.S. Office Action for U.S. Appl. No. 15/844,689, dated Jan. 31, 2018.
U.S. Office Action for U.S. Appl. No. 15/853,885, dated Feb. 23, 2018.
U.S. Office Action for U.S. Appl. No. 15/783,586, dated Apr. 6, 2018.
Aldrich (Sigma-Aldrich MSDS Lithium hexafluorophosphate {http://www.sigmaaldrich.com/MSDS/MSDS/DisplayMSDSPage.do?country=US&language=en&productNumber=450227&brand=ALDRICH} Printed Dec. 19, 2017).
Millipore (MSDS 1-Butyl-1-methylpyrrolidinium bis(trifluoromethylsulfonyl)imide high purity {http://www.emdmillipore.com/Web-US-Site/en_CA/-/USD/ProcessMSDS-Start?PlainSKU=MDA_CHEM-492046&Origin=PDF} date Nov. 4, 2014).
Lewandowski et al. "Ionic liquids as electrolytes for Li-ion batteries—An overview of electrochemical studies", Journal of Power Sources, vol. 194, 2009, pp. 601-609.
Buzzeo et al. "Non-Haloaluminate Room-Temperature Ionic Liquids in Electrochemistry—A Review", ChemPhysChem, 2004, vol. 5, pp. 1106-1120.
Moreno et al. "Ionic Liquid Electrolytes for Safer Lithium Batteries", Journal of the Electrochemical Society, vol. 164, No. 1, 2017, pp. A6026-A6031.
European Search Report for Application No. EP17206661.5, dated Apr. 16, 2018.
U.S. Office Action for U.S. Appl. No. 15/447,889, dated May 24, 2018.
U.S. Notice of Allowance for U.S. Appl. No. 15/582,066, dated Jun. 22, 2018.
U.S. Appl. No. 62/371,874, filed Aug. 8, 2016, Burshtain.
U.S. Appl. No. 62/401,635, filed Sep. 29, 2016, Kedem et al.
U.S. Appl. No. 62/421,290, filed Nov. 13, 2016, Burshtain.
U.S. Appl. No. 62/426,625, filed Nov. 28, 2016, Burshtain et al.
U.S. Appl. No. 62/319,341, filed Apr. 7, 2016, Burshtain.
U.S. Appl. No. 62/337,416, filed May 16, 2016, Burshtain.
U.S. Appl. No. 62/401,214, filed Sep. 29, 2016, Burshtain et al.
U.S. Appl. No. 15/414,655, filed Jan. 25, 2016, Jacob et al.
U.S. Appl. No. 62/427,856, filed Nov. 30, 2016, Burshtain et al.
International Search Report of PCT Application No. PCT/IL2017/050424, dated Jul. 13, 2017.
Office action of U.S. Appl. No. 15/480,919, dated Jul. 5, 2017.
Office action of U.S. Appl. No. 15/447,889, dated Jul. 17, 2017.
Office action of U.S. Appl. No. 15/447,784, dated Jun. 22, 2017.
Office action of U.S. Appl. No. 15/414,655, dated May 9, 2017.
Jankovski et al. "New boron based salts for lithium-ion batteries using conjugated ligands", Physical Chemistry Chemical Physics, May 19, 2016, vol. 18, pp. 16274-16280.
Chaudhuri et al. "Core/shell nanoparticles: classes, properties, synthesis mechanisms, characterization, and applications", Chemical Reviews, vol. 112, No. 4, pp. 2373-2433, 2012.
Qi et al. "Lithium Concentration Dependent Elastic Properties of Battery Electrode Materials from First Principles Calculations", Journal of the Electrochemical Society, 2014, vol. 161, No. 11, pp. F3010-F3018.
Aurbach et al. "A short review of failure mechanisms of lithium metal and lithiated graphite anodes in liquid electrolyte solutions", Solid State Ionics, 2002, vol. 148, pp. 405-416.
Xu et al. "Reversible Conversion of Conducting Polymer Films from Superhydrophobic to Superhydrophilic", Angewandte Chemie, 2005, vol. 44, pp. 6009-6012.

Byeon "Multifunctional metal-polymer nanoagglomerates from singlepass aerosol self-assembly", Scientific Reports, Aug. 10, 2016, pp. 1-8.
Dhawan et al. "Development of Highly Hydrophobic and Anticorrosive Conducting Polymer Composite Coating for Corrosion Protection in Marine Environment", American Journal of Polymer Science, 2015, vol. 5, No. 1A, pp. 7-17.
Maoz et al. "Site-Targeted Interfacial Solid-Phase Chemistry: Surface Functionalization of Organic Monolayers via Chemical Transformations Locally Induced at the Boundary between Two Solids", Angewandte Chemie, 2016, vol. 55, pp. 12366-12371.
Molino et al. "Hydrophobic conducting polymer films from post deposition thiol exposure", Synthetic Metals 162, 2012, pp. 1464-1470.
Skameche et al. "Electrodeposition, electrochemical and optical properties of poly(3-cylopropylmethylpyrrole), a new, hydrophobic, conducting polymer film", American Institute of Physics, 1996, vol. 354, No. 75, pp. 75-81.
Zhao et al. "Artificial Solid Electrolyte Interphase-Protected LixSi Nanoparticles: An Efficient and Stable Prelithiation Reagent for Lithium-Ion Batteries", Journal of the American Chemical Society, Jun. 19, 2015, vol. 137, No. 75, pp. 8372-8375.
Gay et al. "Performance Characteristics of Solid Lithium-Aluminium Alloy Electrodes", Journal of the Electrochemical Society, Nov. 1976, vol. 123, No. 11, pp. 1591-1596.
Li et al. "High-rate aluminium yolk-shell nanoparticle anode for Li-ion battery with long cycle life and ultrahigh capacity" Nature Communications, Aug. 5, 2015, pp. 1-7.
Wen et al. "Thermodynamic and Mass Transport Properties of "LiAl"", Solid-State Science and Technology, Dec. 1979, vol. 126, No, 12, pp. 2258-2266.
Qi et al. "Threefold Increase in the Young's Modulus of Graphite Negative Electrode during Lithium Intercalation", Journal of the Electrochemical Society, 2010, vol. 157, No. 5, pp. A558-A566.
Son et al. "Silicon carbide-free graphene growth on silicon for lithium-ion battery with high volumetric energy density", Nature Communications, Jun. 25, 2015, vol. 6, No. 7393, pp. 1-8.
Tow et al. "A Study of Highly Oriented Pyrolytic Graphite as a Model for the Graphite Anode in Li-Ion Batteries", Journal of the Electrochemical Society, 1999, vol. 146, No. 3, pp. 824-832.
Wu et al. "Stable Li-ion battery anodes by in-situ polymerization of conducting hydrogel to conformally coat silicon nanoparticles", Nature Communications, Jun. 4, 2013, vol. 4, No. 1943, pp. 1-6.
Sun et al. "Silicon/Wolfram Carbide@Graphene composite: enhancing conductivity and structure stability in amorphous-silicon for high lithium storage performance", Electrochimica Acta, Jun. 25, 2016, vol. 191, pp. 462-472.
Guriparti et al. "Review on recent progress of nanostructured anode materials for Li-ion batteries", Journal of Power Sources, 2014, vol. 257, pp. 421-443.
Scott et al. "Ultrathin Coatings on Nano-LiCoO2 for Li-Ion Vehicular Applications", Nano Letters, 2011, vol. 11, pp. 414-418.
Cho et al. "Zero-Strain Intercalation Cathode for Rechargeable Li-Ion Cell", Angewandte Chemie, 2001, vol. 40, No. 18, pp. 3367-3369.
Ngo et al. "Mass-scalable synthesis of 3D porous germanium-carbon composite particles as an ultra-high rate anode for lithium ion batteries", Energy & Environmental Science, 2015, vol. 8, pp. 3577-3588.
Chen et al. "Conductive Rigid Skeleton Supported Silicon as High-Performance Li-Ion Battery Anodes", Nano Letters, 2012, vol. 12, pp. 4124-4130.
Kim et al. "Electrochemical properties of carbon-coated Si/B composite anode for lithium ion batteries", Journal of Power Sources, 2009, vol. 189, pp. 108-113.
He et al. "Gassing in Li4Ti5O12-based batteries and its remedy", Scientific Reports, Dec. 3, 2012, vol. 2, No. 913, pp. 1-9.
Scharner et al. "Evidence of Two-Phase Formation upon Lithium Insertion into the Li1.33Ti1.67O4 Spinel", Journal of the Electrochemical Society, 1999, vol. 146, No. 3, pp. 857-861.
Doughty et al. "A General Discussion of Li Ion Battery Safety", The Electrochemical Society Interface, 2012, pp. 37-44.

(56) References Cited

OTHER PUBLICATIONS

Wang et al. "Boron-doped carbon nanotube-supported Pt nanoparticles with improved CO tolerance for methanol electro-oxidation", Phys. Chem. Chem. Phys., 2012, vol. 14, pp. 13910-13913.
Liu et al. "A pomegranate-inspired nanoscale design for large-volume-change lithium battery anodes", Nature Nanotechnology, Mar. 2014, vol. 9, pp. 187-192.
Tao et al. "Hollow core-shell structured Si/C nanocomposites as high-performance anode materials for lithium-ion batteries", Nanoscale, 2014, vol. 6, pp. 3138-3142.
Song et al. "Is Li4Ti5O12 a solid-electrolyte-interphase-free electrode material in Li-ion batteries? Reactivity between the Li4Ti5O12 electrode and electrolyte", Journal of Materials Chemistry A, 2014, vol. 2, pp. 631-636.
He et al. "Effect of solid electrolyte interface (SEI) film on cyclic performance of Li4Ti5O12 anodes for Li ion batteries", Journal of Power Sources, 2013, vol. 239, pp. 269-276.
Chung et al. "Electronically conductive phospho-olivines as lithium storage electrodes", nature materials, Oct. 22, 2002, vol. 1, pp. 123-128.
Kennedy et al. "Nanowire Heterostructures Comprising Germanium Stems and Silicon Branches as High-Capacity Li-Ion Anodes with Tunable Rate Capability", ACS Nano, Jun. 30, 2015, vol. 9, No. 7, pp. 7456-7465.
Wu et al. "Hydrogen Storage in Pillared Li-Dispersed Boron Carbide Nanotubes", J. Phys. Chem. C, 2008, vol. 112, No. 22, pp. 8458-8463.
Secrist "Compound Formation in the Systems Lithium-Carbon and Lithium-Boron", Journal of the American Ceramic Society, Oct. 1967, vol. 50, No. 10, pp. 520-523.
Suzuki et al. "Silicon nitride thin film electrode for lithium-ion batteries", Journal of Power Sources, 2013, vol. 231, pp. 186-189.
Cui et al. "Carbon-Silicon Core-Shell Nanowires as High Capacity Electrode for Lithium Ion Batteries", Nano Letters, May 8, 2009, vol. 9, No. 9, pp. 3370-3374.
Wang et al. "The dimensionality of Sn anodes in Li-ion batteries", materialstoday, Dec. 2012, vol. 15, No. 12, pp. 544-552.
Bhandavat et al. "Improved Electrochemical Capacity of Precursor-Derived Si(B)CN-Carbon Nanotube Composite as Li-Ion Battery Anode", ACS Applied Materials & Interfaces, Oct. 2, 2012, vol. 4, pp. 5092-5097.
Hu et al. "Silicon/graphene based nanocomposite anode: large-scale production and stable high capacity for lithium ion batteries", Journal of Materials Chemistry A, 2014, vol. 2, No. 24, pp. 9118-9125.
Konno et al. "Application of Si—C—O glass-like compounds as negative electrode materials for lithium hybrid capacitors", Journal of Power Sources, 2009, vol. 191, No. 2, pp. 623-627.
Bhandavat et al. "Synthesis, Characterization, and High Temperature Stability of Si(B) CN-Coated Carbon Nanotubes Using a Boron-Modified Poly(ureamethylvinyl)Silazane Chemistry", Journal of the American Ceramic Society, 2012, vol. 95, No. 5, pp. 1536-1543.
Nowotny et al. "Investigations in the three systems: Molybdenum-Silicon-boron, tungsten-Silicon-boron and in which System: VS12—TaSi2", MB. Chem., 1956, vol. 88, No. 2, pp. 179-182.
Yom et al. "Improved electrochemical behavior of Tungsten Coated Silicon Monoxide-Carbon composite anode in lithium ion battery",Abstract #1041, The Electrochemical Society 224th ECS Meeting, Oct. 27-Nov. 1, 2013.
Kasavajjula et al. "Nano- and bulk-silicon-based insertion anodes for lithium-ion secondary cells", Journal of Power Sources, 2007, Vo. 163, pp. 1003-1039.
Kennedy et al. "High-Performance Germanium Nanowire-Based Lithium-Ion Battery Anodes Extending over 1000 Cycles Through in Situ Formation of a Continuous Porous Network", Nano Letters, 2014, vol. 14, pp. 716-723.
Nitta et al. "High-Capacity Anode Materials for Lithium-Ion Batteries: Choice of Elements and Structures for Active Particles", Particle Systems Characterization, 2014, vol. 31, pp. 317-336.
Hwang et al. "Mesoporous Ge/GeO2/Carbon Lithium-Ion Battery Anodes with High Capacity and High Reversibility", ACS Nano, Apr. 13, 2015, vol. 9, No. 5, pp. 5299-5309.
Balomenos et al. "Exergy Analysis of Metal Oxide Carbothemic Reduction under Vacuum—Sustainability prospects", International Journal of Thermodynamics, Jun. 4, 2012, vol. 15, No. 3, pp. 141-148.
Barton et al. "The Reduction of Germanium Dioxide With Graphite At High Temperatures", Journal of the Less-Common Metals, 1970, vol. 22, pp. 11-17.
Billaud et al. "Synthesis and electrical resistivity of lithium-pyrographite intercalation compounds (stages I, II and III)", Materials Research Bulletin, Jul. 1979, vol. 14, No. 7, pp. 857-864.
Kyotani et al. "Remarkable performance improvement of inexpensive ball-milled Si nanoparticles by carbon-coating for Li-ion batteries", Journal of Power Sources, Jul. 1, 2016, vol. 319, pp. 99-103.
Final office action of U.S. Appl. No. 15/414,655, dated Aug. 14, 2017.
Office action of U.S. Appl. No. 14/926,012, dated Apr. 21, 2016.
Office action of U.S. Appl. No. 14/813,499, dated Mar. 10, 2017.
Office action of U.S. Appl. No. 15/480,888, dated Jul. 5, 2017.
Office action of U.S. Appl. No. 15/263,399, dated Nov. 14, 2016.
Office Action for U.S. Appl. No. 15/480,888, dated Oct. 1, 2018.
U.S. Office Action for U.S. Appl. No. 15/480,904, dated Oct. 29, 2018.
U.S. Office Action for U.S. Appl. No. 15/480,911, dated Nov. 8, 2018.
U.S. Office Action for U.S. Appl. No. 15/480,922, dated Nov. 8, 2018.

* cited by examiner

ANODES FOR LITHIUM-ION DEVICES

CROSS REFERENCE TO RELATED APPLICATIONS

This application is a continuation in part of U.S. patent application Ser. No. 14/813,499, filed on Jul. 30, 2015 and entitled "Anodes for Lithium Ion Devices" which claims the benefit of U.S. Provisional Application Ser. No. 62/030,622, filed on Jul. 30, 2014 and entitled "Compounds for Battery Electrodes, Energy-Storage Devices, and Methods Therein", which are incorporated in their entirety herein by reference.

TECHNICAL FIELD

The present disclosure relates to anode active materials used in lithium ion devices, such as rechargeable lithium ion batteries.

BACKGROUND OF THE INVENTION

Lithium ion batteries, also known as Li-ion Batteries or LIB's are widely used in consumer electronics, for example in mobile telephones, tablets and laptops. LIB's are also used in other fields, such as military uses, electric vehicles and aerospace applications. During discharge of the battery, lithium ions (Li ions) travel from a high-energy anode material through an electrolyte and a separator to a low-energy cathode material. During charging, energy is used to transfer the Li ions back to the high-energy anode assembly. The charge and discharge processes in batteries are slow processes, and can degrade the chemical compounds inside the battery over time. Rapid charging causes accelerated degradation of the battery constituents, as well as a potential fire hazard due to a localized, over-potential build-up and increased heat generation—which can ignite the internal components, and lead to explosion.

Typical Li-ion Battery anodes contain mostly graphite. Silicon, as an anode-alloying component, generally exhibits higher lithium absorption capacities in comparison to anodes containing only graphite. Such silicon-containing electrodes, however, usually exhibit poor life cycle and poor Coulombic efficiency due to the mechanical expansion of silicon upon alloying with lithium, and upon lithium extraction from the alloy, which reduce the silicon alloy volume. Such mechanical instability results in the material breaking into fragments.

There are several types of materials, which are widely used as the anode material. Carbon in its graphite form, to date, is still the anode material of choice in lithium ion batteries. The electrochemical activity of carbon comes from the intercalation of lithium ions between the graphene layers, where one lithium ion is occupying approximately 6 atoms of carbon to give theoretical specific capacity of ~372 mAh/g and volumetric capacity of 330-430 mAh/cm3, which is limited by the layer structure of the graphite. Moreover, due to the intercalation mechanism of lithium ions in graphite, the charging and discharging rates are yet limited, and hence bound to metallization of lithium, mainly during fast charging followed by slow discharging.

However, graphite anode material is cheap and has a limited expansion (e.g., shrinkage during lithium intercalation). single crystalline graphitic particles undergo uniaxial 10% strain along the edge planes, in addition, the Solid-Electrolyte Interface (SEI) formation is stable, and can be formed also on the intercalation basal planes and thus the SEI also preferentially forms on these planes as well. Nevertheless, the SEI can still be damaged from this expansion-shrinkage mechanism, being one of the reasons for capacity fading.

Unlike graphite, lithium titanium oxide (LTO) has a successful commercial usage due to the combination of superior thermal stability and high discharging and charging rate capability. However, LTO has low gravimetric capacity and higher cost due to the titanium. The high charging/discharging rates capability is due to a more stable microstructure, i.e. "zero strain" intercalation mechanism in combination with a high potential lithiation. The latter is also the reason for a low cell potential however, the volume change of LTO during lithiation—delithiation is less than 0.2%. Nevertheless, surface reactions are not avoidable using LTO anodes. Such anodes suffer from severe gassing due to reaction between the organic electrolyte and the LTO active material. To overcome this issue, there are several reports suggesting the use of carbon coating. However, carbon (and also graphite) may catalyze and accelerate electrolyte decomposition in the formation of the SEI, especially at high temperatures and/or high surface potential.

The use of silicon (Si) which serves as a conversion material, namely, as anode active material, has on one hand much higher gravimetric and volumetric capacity for lithium, but on the other hand suffers from high volumetric changes during charging/discharging cycles which may cause low cyclability.

However, the use of Silicon (Si) as anode active material may have three major problems: (I) large volume changes during charge and discharge cycles; (II) instability of the Solid-Electrolyte Interface (SEI) also due to the volume changes; and (III) fracturing during discharge of the silicon, which may be caused both by the volume change on one hand and the kinetics of the metal-metal bonding and disbonding reaction on the other.

SUMMARY OF THE INVENTION

Some embodiments of the invention may be directed to an anode active material for lithium-ion devices and in particular to anodes for lithium-ion devices. The anode material for a lithium ion device according to some embodiments of the invention may include an active material including silicon particles and boron carbide nanoparticles ($B_4C$). According to some embodiments of the present invention, the boron carbide nanoparticles may be at least one order of magnitude smaller than the silicon particles. In some embodiments, the weight percentage of the silicon particles may be between about 4 to 35 weight % of the total weight of the anode material and the weight percentage of the boron carbide nanoparticles may be between about 2.5 to 25.6 weight % of the total weight of the anode material.

In some embodiments of the invention, an active material for producing anodes for Li-ion devices is provided. The active material may include a plurality of silicon particles at a weight percentage of about between 5 to 47 weight % of the total weight of the active material and boron carbide nanoparticles at a weight percentage of about between 3.83 to about 31.94 weight % of the total weight of the active material. In some embodiments, the boron carbide nanoparticles may be at least one order of magnitude smaller than the silicon particles.

In some embodiments, the active material may further include carbon. In some embodiments, the active material may further include tungsten-carbide nanoparticles at a weight percentage of between about 7.45 to about 13.85 weight % of the total weight of the anode material.

Some embodiments of the invention may be directed to a lithium ion device. The lithium ion device may include an anode having an active material comprising silicon particles and boron carbide nanoparticles. In some embodiments, the boron carbide nanoparticles may be at least one order in magnitude smaller than the silicon particles. In some embodiments, the weight percentage of the silicon particles may be between about 4 to 35 weight % of the total weight of the anode and the weight percentage of the boron carbide nanoparticles may be between about 2.5 to 25.6 weight % of the total weight of the anode. The lithium ion device may further include a cathode and an electrolyte.

Some embodiments of the invention may be directed to a method for making an anode material for a lithium ion device. The method may include forming an alloy from silicon powder, carbon, and a boron-containing compound to form an active material of an active material comprising silicon particles coated with boron carbide nanoparticles. In some embodiments the boron carbide nanoparticles may be at least one order of magnitude smaller than the silicon particles. In some embodiments, the method for making the anode material may further include a step of adding the active material to a matrix to form the anode material. In some embodiments, the weight percentage of the silicon may be between about 4 to about 35 weight % of the total weight of the anode material and the weight percentage of the boron is between about 2.5 to 25.6 weight % of the total weight of the anode material.

Some embodiments of the invention may be directed to lithium-ion devices and in particular to anodes for lithium-ion devices. An anode material for a lithium ion device according to some embodiments of the invention may include an active material including silicon and boron. In some embodiments, the weight percentage of the silicon may be between about 4 to 35 weight % of the total weight of the anode material and the weight percentage of the boron may be between about 2 to 20 weight % of the total weight of the anode material. In some embodiments, the weight percentage of the silicon may be between about 5 to about 25 weight % of the total weight of the anode material and the weight percentage of the boron may be between about 5 to about 18 weight % of the total weight of the anode material.

An active material for producing anodes for Li-ion devices may include silicon at a weight percentage of between about 5 to 47 weight % of the total weight of the active material and boron at a weight percentage of between about 3 to 25 weight % of the total weight of the active material. In some embodiments, the active material may include carbon. In some embodiments, the active material may further include tungsten at a weight percentage of between about 6 to about 25 weight % tungsten of the total weight of the active material.

Some embodiments of the invention may be directed to a lithium ion device. The lithium ion device may include an anode having an active material comprising silicon and boron. In some embodiments, the weight percentage of the silicon may be between about 4 to 35 weight % of the total weight of the anode and the weight percentage of the boron may be between about 2 to 20 weight % of the total weight of the anode. The lithium ion device may further include a cathode and an electrolyte.

Some embodiments of the invention may be directed to a method for making an anode material for a lithium ion device. The method may include forming an alloy from silicon powder, carbon, and a boron-containing compound to form an active material, and adding the active material to a matrix to form the anode material. In some embodiments, the weight percentage of the silicon is between about 4 to about 35 weight % of the total weight of the anode material and the weight percentage of the boron is between about 2 to about 20 weight % of the total weight of the anode material.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the invention describe anodes for lithium ion devices, an active material (anode intercalation compounds) for manufacturing the anodes and the lithium ion devices. The term active material refers herein to an alloying material that is chemically active with lithium ions. The lithium ion devices may include lithium ion batteries (Li-ion battery or LIB), Li-ion capacitors (LIC), Li-ion hybrid system including both a battery and a capacitor or the like.

The active material may include an alloy comprising graphite (C), silicon (Si) and boron (B). In some embodiments, the active material may include silicon particles and boron-carbide nanoparticles. The silicon and boron-carbide may be milled together to form an alloy. Other methods for forming alloys may be used. In some embodiments, the active material may further include tungsten (W) in the form of tungsten carbide (WC) nano-particles. In some embodiments, the active material may include an alloy comprising graphite (C), silicon (Si) and tungsten (W).

According to some embodiments of the invention, the composition of the anode may comprise an active anode material as detailed herein, a binder and/or plasticizer (e.g. polyvinylidene fluoride (PVDF)) and a conductive agent (e.g. carbon black and carbon nano-tubes (CNT)).

According to some embodiments, the anode material may include active material that may include silicon particles and boron carbide nanoparticles. The boron carbide nanoparticles may be at least one order of magnitude smaller than the silicon particles, as illustrated in FIGS. 1-4. In some embodiments, the size of the silicon particles may be in the range of 100-500 nm, for example, 200 nm, 250 nm, 300 nm, 400 nm. Each silicon particle may be at least partially covered (e.g., coated, doped) with $B_4C$ nanoparticles. According to some embodiments of the invention, the size of the boron carbide ($B_4C$) nanoparticles may be in the range of 10-50 nm.

According to some embodiments, the weight percentage of the silicon particles may be between about 4 to 35 weight % of the total weight of the anode material and the weight percentage of the boron carbide nanoparticles may be between about 2.5 to about 25.6 weight % of the total weight of the anode material. In some embodiments, the weight percentage of the silicon particles may be between about 5 to 25 weight % of the total weight of the anode material, the weight percentage of the boron carbide nanoparticles may be between about 6 to 22 weight % of the total weight of the anode material. A weight percentage of and additional carbon (in the form of graphite) within the active material may be between about 5 to 60 weight % of the total weight of the anode material, for example, between 7 to 48 weight %.

Figure 1:
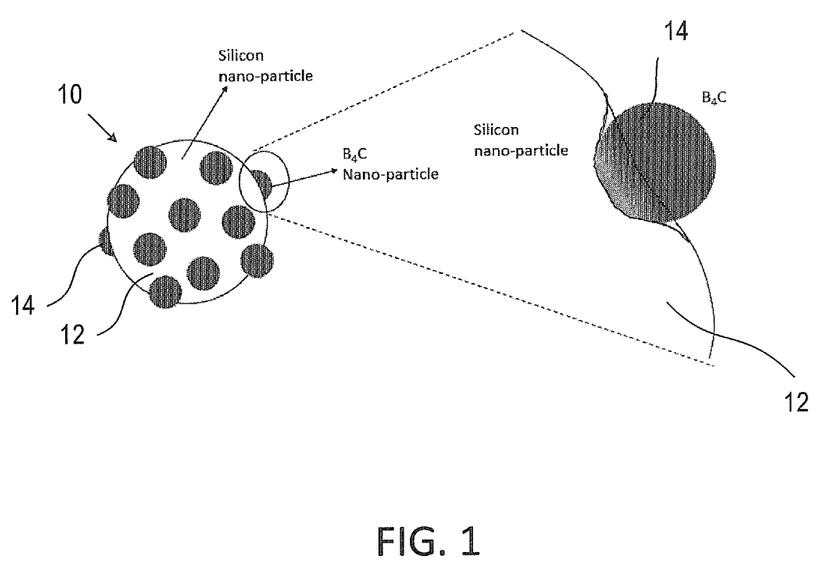
FIG. 1 is an illustration of a silicon particle covered by boron-carbide ($B_4C$) nanoparticles according to some embodiments of the invention.

Reference is made to FIG. 1, which is an illustration of a particles that may be included in an active material according to some embodiments of the invention. A particle 10 may include a silicon particle 12 and one or more boron-carbide nanoparticles 14. Silicon particle 12 may be of a size of 100-500 nm, for example, 200 nm, 250 nm, 300 nm, 400 nm, and may be at least partially coated (e.g., coated, doped) with $B_4C$ nanoparticles 14 of smaller scale (one order of magnitude smaller than the silicon particle), for example, 10-50 nm. In some embodiments, the $B_4C$ nano-particles 14 may further be at least partially embedded on the surface of the silicon particle, as illustrated in the enlargement view in the right side of FIG. 1.

In some embodiments, silicon particles 10 are coated in a shell-like formation where the $B_4C$ nanoparticles 14 are partly coating and partly embedded in the larger silicon particles. High energy mechanical milling of $B_4C$ nanoparticles with silicon particles may be used. The outcome of such ball milling may be a powder that includes silicon nanoparticles as illustrated in FIG. 1 and aggregates of silicon particles as illustrated in FIG. 2.

Figure 2:
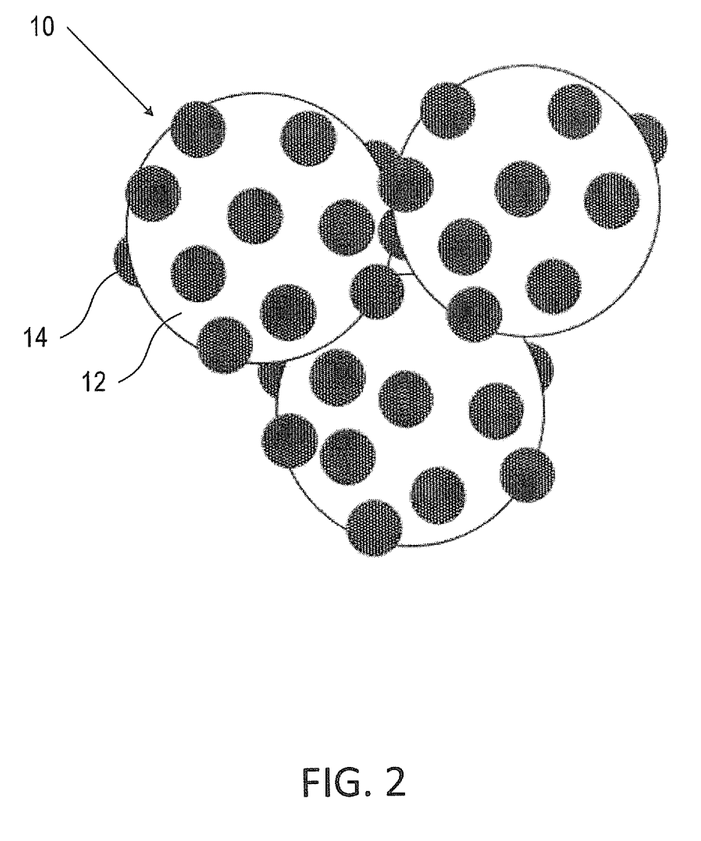
FIG. 2 is an illustration of an agglomerate of the silicon particles of FIG. 1 according to some embodiments of the invention.

FIG. 2 is an illustration of an aggregate of silicon particles 10 each at least partially coated with $B_4C$ nanoparticles 14 of a smaller scale. Each of silicon particles may be of the size of 100-500 nm, for example, 200 nm, 250 nm, 300 nm, 400 nm. The $B_4C$ nanoparticles 14 coating each silicon particle may be an order of magnitude smaller than the silicon nanoparticle, for example, 10-50 nm.

Figure 3:
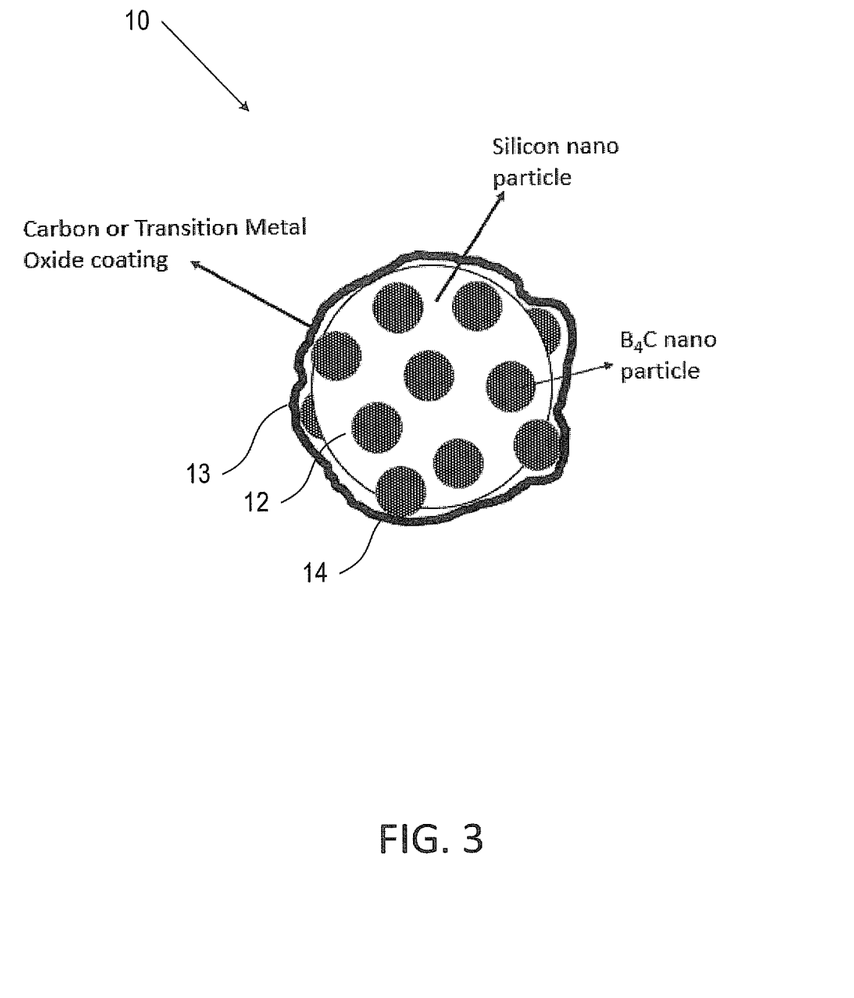
FIG. 3 is an illustration of a coated silicon particle of FIG. 1, coated with carbon or a transition metal oxide according to some embodiments of the invention.

FIG. 3 is an illustration of silicon particles 12 coated with boron carbide nanoparticle 14 which are further coated with a film 13 of at least one of: carbon and transition metal oxide (e.g., $TiO_2$, $CrO_3$, and the like). In some embodiments of the invention, in order to increase mechanical stability, electron transport, and Li transport, while maintaining lithium diffusion paths within the anode, a coating of each Si—$B_4C$ particle or an aggregate of Si—$B_4C$ particles may be coated with thin film 13. Thin film 13 of carbon or transition metal oxide may be added to the Si—$B_4C$ particles and/or aggregates. The thin film 13 may increase the battery (e.g., cell) potential, may protect the silicon surface from the electrolyte, and thus may increase the SEI stability and reduce its tendency to crack during the cycle life, especially when the charge rate is high (e.g. >2 C) which promotes higher surface potential.

Reference is made to FIG. 3 which is an illustration of a Si—$B_4C$ nanoparticle 10 (e.g., the particle of FIG. 1) coated with either carbon or transition metal oxide thin film 13 (the dark layer around the particle) according to some embodiments of the invention.

Figure 4:
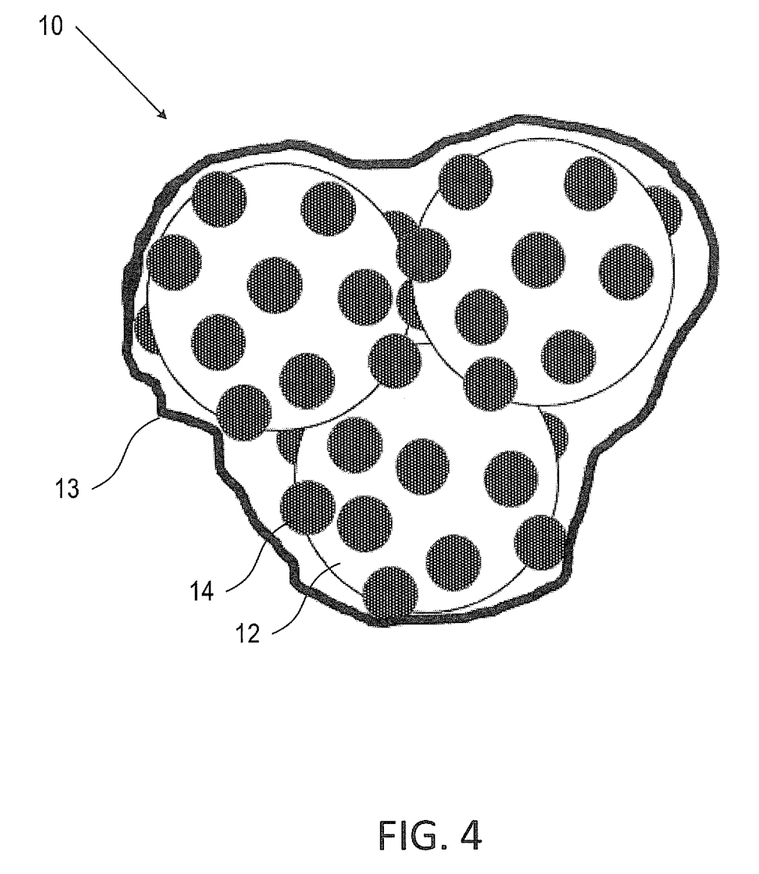
FIG. 4 is an illustration of a coated agglomerate of silicon particles of FIG. 1 according to some embodiments of the invention.

FIG. 4 is an illustration of an aggregate of Si—$B_4C$ particles 10 coated with either carbon or transition metal oxide thin film 13 according to some embodiments of the invention.

In some embodiments, carbon thin film 13 may encapsulate Si—$B_4C$ 10 nanoparticles or aggregates with a sufficient void space to allow for volume expansion of the Si—$B_4C$ particles. The thin film may allow stabilizing the SEI and may prevent particles from sintering into larger particles, enabling high cycle life even at high mass loadings. However, carbon and graphite may catalyze electrolyte decomposition, for example, at high temperatures and/or at elevated potentials, for example, during high C rate (e.g. >2 C). At high C rates of charge and discharge, the surface potential may, in some cases, be elevated and hence further increase the decomposition of the electrolyte.

In order to overcome the de-composition of the electrolyte a thin carbon film 13 (e.g., in a thickness range of 1-10 nm) according to some embodiments of the invention may be located in a close proximity to the $B_4C$ particles 14, embedded on the silicon (e.g. silicon particle 12). The carbon film may include: amorphous carbon, graphite, graphene or the like. The coating may be done by any known method, for example, by mechanical milling (as disclosed above) or by thermal coating.

The close proximity, and optionally contact, between the carbon 13 and the $B_4C$ nanoparticles 14 may allow achieving the same effect as boron doped carbon anodes. Such arrangement may allow further decrease of the surface potential. As a result the carbon coating interface 13 with the electrolyte may be less reactive toward the electrolyte (due to the presence of $B_4C$ nanoparticles 14), and as such may reduce the probability for catalytic reaction with the electrolyte, especially during the cycle life of the anode which may cause fractional breakage of the coating during expansion-shrinkage process. Therefore, coated silicon-$B_4C$ particles 10 may have both the mechanical properties of the $B_4C$ nanoparticles together with the physical properties of boron doped carbonlike material. Furthermore, due to the unique properties of boron, the coated silicon-$B_4C$ particles may allow for a more homogeneous distribution of the silicon particles with fewer tendencies towards agglomeration, and hence may allow better control over the coating of the silicon.

In some embodiments, the silicon-$B_4C$ nanoparticles 10 or aggregates may be coated with transition metal oxide coating 13. Coating of various metal oxides (for example $Al_2O_3$, $B_2O_3$, $TiO_2$, $ZrO_2$) over cathode active material such as LCO (Lithium Cobalt Oxide) was found to be effective in enhancing stability and performance characteristics due to the mechanically and chemically stable oxide material that may reduce structural changes of these lithium metal oxides. Such coatings were also found in some cases to ensure smoother charge transfer across the interfaces between the coating electrolyte and the active material.

In some embodiments, coating silicon particles 12 with transition metal oxide 13 for forming an anode system (for example, Si coated by MnO) may change the SEI formation and increase stability. In some embodiments, the thin metal oxide film 13 may enable lithium transport from both sides of the anode thus may prevent direct interaction of the silicon with the electrolyte therefore, stabilizing the SEI.

In some embodiments, a transition metal oxide coating 13 over a silicon particle 12 (not covered by $B_4C$ nanoparticles 14) may also be doomed to SEI destruction during the lithiation—de lithiation cycling, with the same mechanism as described earlier for carbon coating. However, while the charge and mass transfer are probably faster than with carbon coating, the mechanical properties of such coating may be less stable than amorphous carbon coating. Therefore, cracks may be formed in the coating that may eventually lead to loss in capacity and cyclability.

In some embodiments, the addition of $B_4C$ nanoparticles 14 that cover partially the silicon larger particle 12, located between the silicon particle and the transition metal oxide coating 13, may overcome the above mentioned disadvantages. Coating silicon-$B_4C$ 10 nanoparticles with transition metal oxide thin film 13 (e.g., 1-10 nm) may produce a much more stable system for the same coating over a silicon-coated system. The $B_4C$ nanoparticles partial coverage of the silicon particle followed by the transition metal oxide thin film coating may create a double skeleton system with enhanced mechanical stability, leading to a system with high cyclability even at high charge and/or discharge C rates (above 2 C).

In some embodiment of the invention, an active material is herewith provided.

The active material may include a silicon-carbon-boron alloy, in which the weight percentage of the silicon nantoparticle may be between about 5 to about 47 weight % of the total weight of the active material, the weight percentage of the boron may be between about 3 to about 25 weight % of the total weight of the active material and the weight percentage of the carbon may be between about 7 to about 75 weight % of the total weight of the active material.

In some embodiments, weight percentage of the carbon may be between about 10 to about 60 weight % of the total weight of the active material.

In some embodiments, the active material may include a silicon-carbon-boron-tungsten alloy, in which the weight percentage of the silicon may be between about 5 to about 47 weight % of the total weight of the active material, the weight percentage of the boron may be between about 3 to about 25 weight % of the total weight of the active material, the weight percentage of the carbon may be between about 7 to about 75 weight % of the total weight of the active material and the weight percentage of the tungsten may be between about 6 to 25 weight % of the total weight of the active material.

In some embodiments, weight percentage of the carbon may be between about 10 to 60 weight % of the total weight of the active material.

In some embodiments, the active material may include a silicon-carbon-tungsten alloy, in which the weight percentage of the silicon may be between about 5 to about 47 weight % of the total weight of the active material, the weight percentage of the carbon may be between about 7 to about 75 weight % of the total weight of the active material and the weight percentage of the tungsten may be between about 6 to about 25 weight % of the total weight of the active material. In some embodiments the active material may include tungsten-carbide nanoparticles at a weight percentage of between about 7.45 to about 13.85 weight % of the total weight of the anode material In some embodiment, the anode material may further include a binder and/or plasticizer (e.g. polyvinylidene fluoride (PVDF)) at a weight percentage of about between 0.1 to about 10 weight % of the total weight of the anode.

In some embodiments, the anode material may further include carbon nano-tubes (CNT) at a weight percentage of about between 0.05 to 0.5 weight percent of the total weight of the anode. The carbon nano-tubes may replace the tungsten carbide particles or be added to the anode material in addition to the tungsten carbide particles. Accordingly, the alloy material may include between 0.06-0.8 weight percent carbon nano-tubes of the total weight of the anode material. An exemplary anode material may include 0.1-0.3 weight % single-rod carbon nano-tubes.

Figure 5:
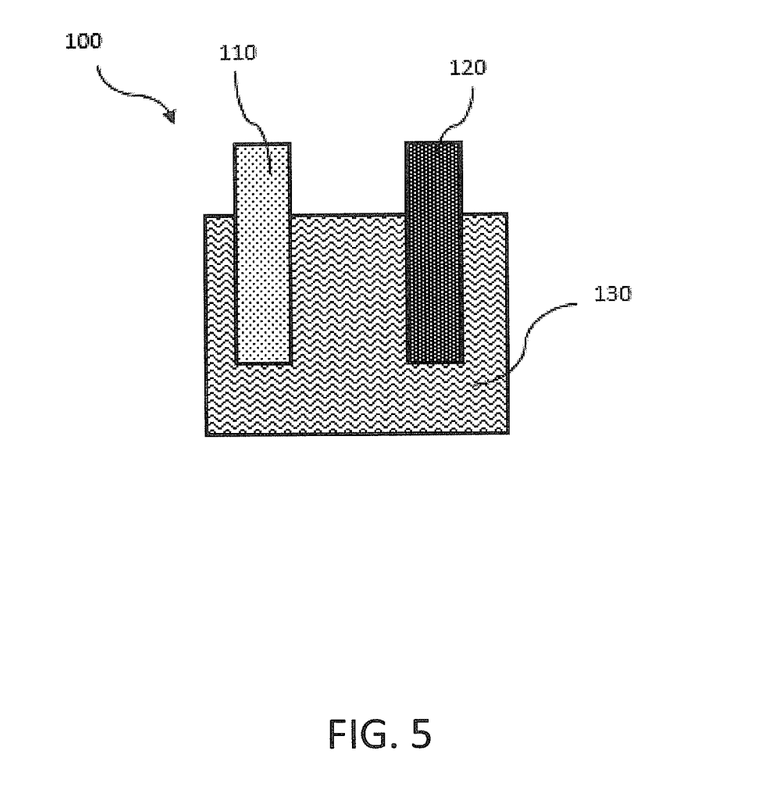
FIG. 5 is an illustration of an exemplary lithium ion device according to some embodiments of the invention.

FIG. 5 illustrates a lithium ion device 100 which may include an anode 110 as detailed herein, a cathode 120 and an electrolyte 130 suitable for lithium ion devices. Anode 110 may include an active material comprising particles 10 that include silicon particles 12 and boron carbide nanoparticles 14 (as illustrated and discussed above with respect to FIG. 1-4).

A non-limiting list of exemplary lithium ion devices may be Li-ion batteries, Li-ion capacitors and Li-ion hybrid system including both a battery and a capacitor. In accordance with the above, the lithium ion device 100 may include an anode 110, a cathode 120 and an electrolyte 130. Electrolyte 130 may be in the form of a liquid, solid or gel. Examples of solid electrolytes include polymeric electrolytes such as polyethylene oxide, fluorine-containing polymers and copolymers (e.g., polytetrafluoroethylene), and combinations thereof. Examples of liquid electrolytes include ethylene carbonate, diethyl carbonate, propylene carbonate, fluoroethylene carbonate (FEC), and combinations thereof. The electrolyte may be provided with a lithium electrolyte salt. Examples of suitable salts include $LiPF_6$, $LiBF_4$, lithium bis(oxalato)borate, $LiN(CF_3SO_2)_2$, $LiN(C_2F_5SO_2)_2$, $LiAsF_6$, $LiC(CF_3SO_2)_3$, $LiClO_4$, and LiTFSI. Cathode 120 may include cathode compositions suitable for the use in lithium ion devices. Examples of suitable cathode compositions may include $LiCoO_2$, $LiCo_{0.33}Mn_{0.33}Ni_{0.33}O_2$, $LiMn_2O_4$, and $LiFePO_4$.

In some embodiments, lithium ion device 100 may further include a separator (not illustrated). The separator may be configured to separate between the anode and the cathode. An exemplary separator according to some embodiments of the invention may include poly ethylene (PE), polypropylene (PP) or the like.

Anode 110 according to embodiments of the invention, when incorporated in a lithium ion device, such as a battery, exhibits improved cycle-life and Coulombic efficiency over common Si-based anodes. The mechanical stability of the anode (achieved after the first cycle, or after several initial cycles), and hence of the lithium ion device, is also improved. Such stability is assumed to be attributed to the incorporation of the tungsten and/or boron into the expanding silicon-lithium alloy during the charge-discharge process. Such incorporation may help prevent metallization of the lithium during charging due to the relatively strong lithium-tungsten and/or lithium-boron binding. Such strong binding may result in a partly-charged assembly which may contribute to the enhanced stability and cycle life of the anode.

The presence of boron and/or tungsten may facilitate the electrochemical utilization of the silicon, and substantially may reduce the migration of silicon into the electrode substrate. Moreover, boron carbide may enhance the binding energy of Li atoms, (boron's binding energy is greater than the cohesive energy of lithium metal) and may prevent lithium from clustering at high lithium doping concentrations.

Boron carbide, which is inert to oxidation at the anode in the electrochemical reaction, interacts with both silicon, silicon oxide and lithium. Lithium ions may react with boron carbide to form lithium carbide, lithium boride and lithium tetraborate thus leaving the Li ions partly charged. Such partial charges in Li—Si—C alloys may stabilize the overall structure during the extraction and insertion of the lithium ions.

Tungsten carbide with naturally-occurring silicon oxide-carbon composites may improve the electrochemical behavior of the anode. The tungsten-carbide may act as hydron ($H^+$) ion barrier and further as a $\delta^+$ center inside the Si/C structure. The $\delta^+$ centers may capture the Li ions to further prevent metallization of Li.

Some embodiments of the invention, may be related to a method for making an anode material for a lithium ion device. Some embodiments, may include a step of forming an alloy from silicon powder, carbon, and a boron-containing compound to form an active material of an active material comprising silicon particles coated with boron carbide nanoparticles. In some embodiments the boron carbide nanoparticles may be at least one order of magnitude smaller than the silicon particles.

Preparation of the anode may include milling and/or mixing processes. In some embodiments, a silicon powder and graphite powder may be inserted into a high-energy ball-miller to be milled under protective atmosphere or non-protective atmosphere. In some embodiments, a boron-carbide ($B_4C$) powder may be added to the pre-milled Si/C mixture inside the miller. The miller may include hardened alumina media that may be agitated at 1000-1500 RPM. The milling stage may produce an alloy having nano-size particles of around 20-100 nm particle size. In some embodiments, an emulsion containing nano-sized tungsten carbide (WC) particles may be added to the as milled powder (Si/C or SI/C/B alloy) at the end of the milling process to produce the active material for the anode. The tungsten carbide particle size may be between around 20 to 60 nm. As used herein, "nano-sized" particles means particles having an average particle size less than one micron, in embodiments "nano-sized" means particles having an average particle size less than 100 nm.

The active material for making anodes for Li-ions devices (e.g., device 100), such as batteries may include a silicon-carbon-boron-tungsten alloy, a silicon-carbon-boron alloy or a silicon-carbon-tungsten alloy. Additional polymeric binders and conductive additives may be added to the alloy to form the final anode material. An exemplary anode, according to embodiments of the invention, may include conductive materials at a weight percentage of about between 5 to 10 weight % of the total weight of the anode material and binder material at a weight percentage of about between 5 to 10 weight percent of the total weight of the anode material. Exemplary conductive elements may include spherical carbon, carbon nano-tubes and/or graphene particles.

In some embodiments, the active material may include a silicon-carbon-boron alloy, in which the weight percentage of the silicon may be between about 5 to about 47 weight of the total weight of the active material, the weight percentage of the boron may be between about 3 to about 25 weight % of the total weight of the active material and the weight percentage of the carbon may be between about 7 to about 75 weight % of the total weight of the active material. In some embodiments, weight percentage of the carbon may be between about 10 to about 60 weight % of the total weight of the active material. In some embodiments, the anode material may further include carbon nano-tubes (CNT) at a weight percentage of between 0.05 to 0.5 weight % of the total weight of the anode material. An exemplary anode material may include 0.1-0.3 weight % single-rod carbon nano-tubes.

EXAMPLES

Figure 6:
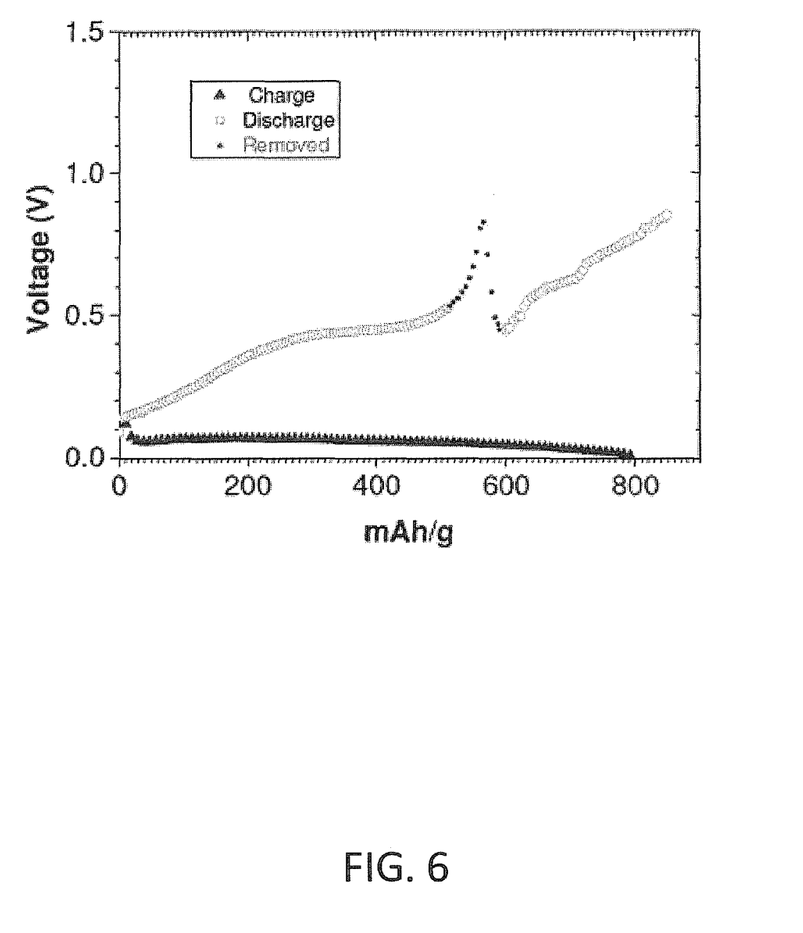
FIG. 6 is a graph presenting first-cycle charge-discharge curves of an exemplary lithium-ion half-cell for a silicon-based anode containing boron according to some embodiments of the invention.

Reference is made to FIG. 6 presenting first-cycle charge-discharge curves of an exemplary lithium-ion half-cell for a silicon-based anode containing boron according to some embodiments of the invention. The voltage of the half-cell is presented as a function of the charge values in mAh/g. The exemplary anode material included (in weight percentage from the total weight of the anode) 48% C, 30% Si, 5.5% B, 8.3% binder and 8.2% conductive additives ($C_{0.48}Si_{0.30}B_{0.055}Binder_{0.083}ConductiveAditive_{0.082}$). The as-milled C/Si/B alloy (i.e. the active material) included 57% C, 36% Si and 7% B (weight percent of the total weight of the alloy ($C_{0.57}Si_{0.36}B_{0.07}$)). Looking at the graphs of FIG. 6, the charge yielded 792 mAh/g, and the discharge produced 760 mAh/g, resulting in a 96% first-cycle efficiency. The first-cycle efficiency is defined as the first discharge yield divided by the first charge yield. It is noted that within the discharge curve, there is a region in which the current is positive but the potential difference drops. Such "inverse behavior" is probably due to an internal self-reorganization; therefore, this region was removed from the charge-discharge calculation.

Figure 7:
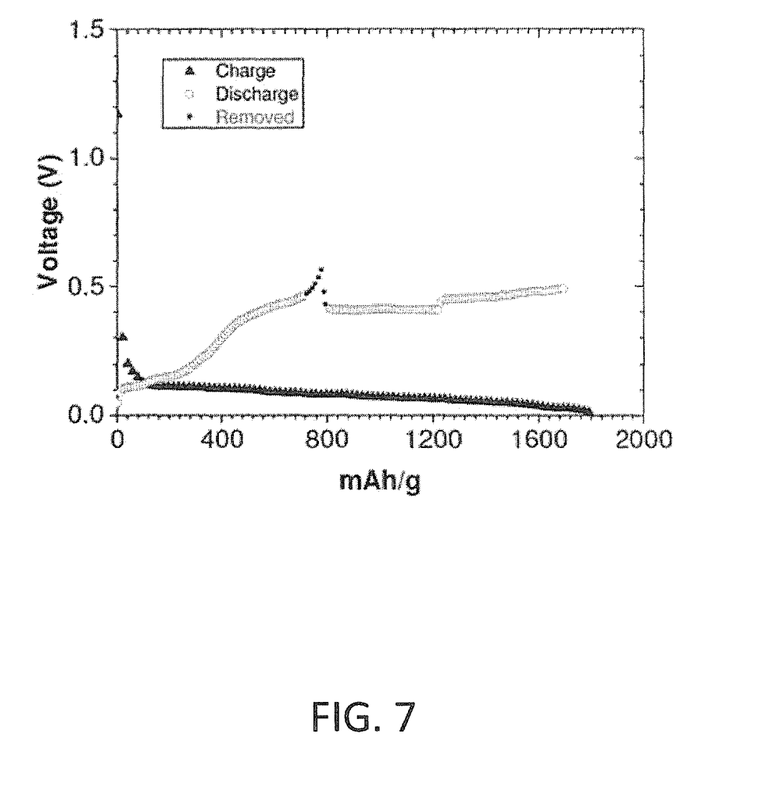
FIG. 7 is a graph presenting first-cycle charge-discharge curves of an exemplary lithium-ion half-cell for a silicon-based anode containing tungsten according to some embodiments of the invention.

Reference is made to FIG. 7, presenting first-cycle charge-discharge curves of an exemplary lithium-ion half-cell for a silicon-based anode containing tungsten according to some embodiments of the invention. The voltage of the half-cell is presented as a function of the charge values in mAh/g. The exemplary anode material included 41.3% C, 30.1% Si, 11.6% W, 8.4% binder and 8.6% conductive additives ($C_{0.413}Si_{0.301}W_{0.116}Binder_{0.084}ConductiveAditive_{0.086}$) in weight percentage of the total weight of the anode. The active material included 50% C, 36% Si and 14% W in weight percentage of the total weight of the alloy ($C_{0.50}Si_{0.36}W_{0.14}$). Looking at the graph of FIG. 7, the charge yielded 1803 mAh/g, and the discharge produced 1600 mAh/g, resulting in 88.7% first-cycle efficiency. It is noted again, as in FIG. 6, that within the discharge curve, there is a region in which the current is positive but the potential difference drops. Such "inverse behavior" is probably due to an internal self-reorganization; therefore, this region was removed from the charge-discharge calculation. For the same amount of Si (30%), the B addition yielded a higher efficiency than the W addition.

Figure 8:
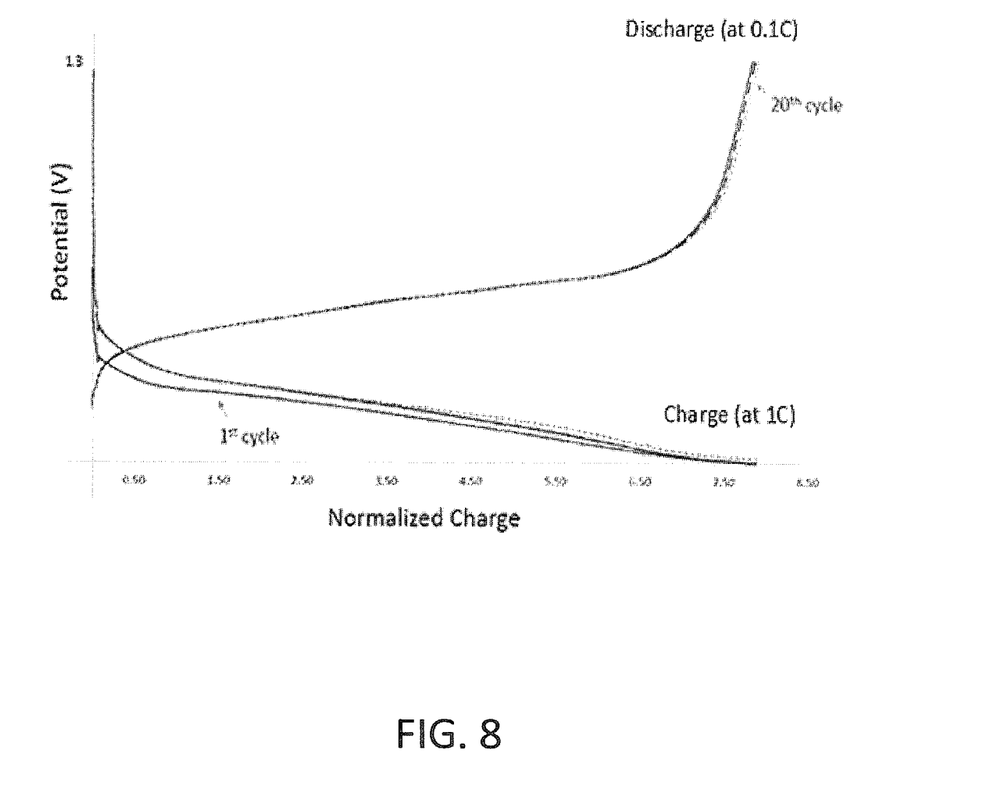
FIG. 8 is a graph presenting initial cycles, charge-discharge curves of an exemplary lithium-ion half-cell for a silicon-based anode containing boron-carbide and tungsten-carbide according to some embodiments of the invention.

According to some embodiments, both boron and tungsten are part of the anode. FIG. 8 presents a graph showing the charge-discharge curves of the first 20 cycles of an exemplary lithium-ion half-cell for a silicon-based anode containing boron and tungsten according to some embodiments of the invention. The voltage of the half-cell is presented as a function of the normalized charge (normalized by the highest value). The exemplary anode material included 42% C, 30% Si, 5.0% B, 10.0% W, 10% binder and 3% conductive additives ($C_{0.42}Si_{0.3}B_{0.05}W_{0.1}Binder_{0.1}ConductiveAditive_{0.03}$) in weight percentage of the total weight of the anode. The active material included 48.3% C, 34.5% Si, 5.7% B and 10.5% W in weight percentage of the total weight of the alloy ($C_{0.483}Si_{0.345}B_{0.057}W_{0.105}$). The calculated first-cycle efficiency was 92%. However, the life-cycle efficiency was 98.5-100%.

Figure 9:
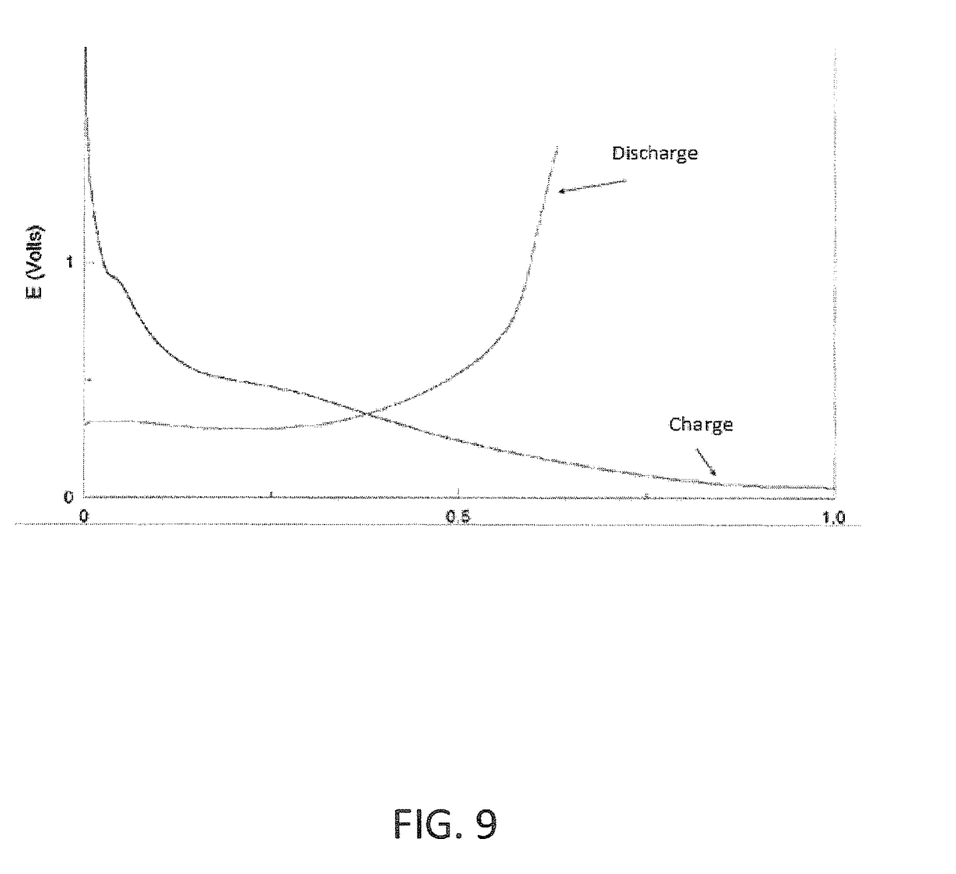
FIG. 9 is a graph presenting first-cycle charge-discharge curves of an exemplary lithium-ion half-cell for a silicon-based anode.

Reference is made to FIG. 9 presenting first-cycle charge-discharge curves of an exemplary lithium-ion half-cell for a silicon-based anode containing silicon and carbon. The voltage of the half-cell is presented as a function of the normalized charge (normalized by the highest value). The exemplary anode material included 57% C, 30% Si, 10% binder and 3% conductive additives ($C_{0.57}Si_{0.3}Binder_{0.1}ConductiveAditive_{0.03}$) in weight percentage of the total weight of the anode. The active material included 66% C and 34% Si in weight percentage of the total weight of the alloy ($C_{0.66}Si_{0.34}$). Looking at the graph of FIG. 9 the calculated first efficiency was approximately 65% much lower than the anodes of the examples of FIGS. 6-8.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. An anode material for a lithium ion device, comprising:
an active material comprising silicon particles in the size of 100-500 nm, and boron carbide nanoparticles, wherein the boron carbide nanoparticles are at least one order of magnitude smaller than the silicon particles, and wherein the weight percentage of the silicon particles is between about 4 to about 35 weight % of the total weight of the anode material and the weight percentage of the boron carbide nanoparticles is between about 2.5 to about 25.6 weight % of the total weight of the anode material.

2. The anode material of claim 1, wherein each of the silicon particles is coated on at least a region of its surface by some of the boron carbide nanoparticles.

3. The anode material of claim 2, wherein at least some of silicon particles coated with the boron carbide nanoparticle are further coated with a film of at least one of: carbon and transition metal oxide.

4. The anode material of claim 2, wherein aggregates that include a plurality of silicon particles coated with the boron carbide nanoparticle are being further coated with a film of at least one of: carbon and transition metal oxide.

5. The anode material according to claim 1, wherein the boron carbide nanoparticles are at least partially embedded in the surface of each silicon particles.

6. The anode material of claim 1, wherein the active material further comprises carbon, not included in the boron carbide, at a weight percentage of about between 5 to about 60 weight % of the total weight of the anode material.

7. The anode material of claim 1, wherein the active material further comprises tungsten-carbide nanoparticles at a weight percentage of between about 7.45 to about 13.85 weight % of the total weight of the anode material.

8. The anode material of claim 1, further comprising:
a binder at a weight percentage of between about 0.1 to about 10 weight % of the total weight of the anode material.

9. The anode material of claim 1, further comprising:
carbon nano-tubes (CNT) at a weight percentage of between about 0.05 to about 0.5 weight % of the total weight of the anode material.

10. An active material for a producing anode for lithium ion devices, the active material, comprising:
silicon particles in the size of 100-500 nm, and at a weight percentage of between 5 to about 47 weight % of the total weight of the active material; and
boron carbide nanoparticles at a weight percentage of between about 3.8 to about 32 weight % of the total weight of the active material,
wherein the boron carbide nanoparticles are at least one order of magnitude smaller than the silicon particles.

11. An active material according to claim 10, wherein each of the silicon particles is coated on at least a region of its surface by some of the boron carbide nanoparticles.

12. An active material according to claim 11, wherein at least some of silicon particles coated with the boron carbide nanoparticle are further coated with a film of at least one of: carbon and transition metal oxide.

13. An active material according to claim 11, wherein aggregates that include a plurality of silicon particles coated with the boron carbide nanoparticle are further coated with a film of at least one of: carbon and transition metal oxide.

14. An active material according to claim 10, wherein the boron carbide nanoparticles are at least partially embedded in the surface of each silicon particles.

15. A lithium ion device comprising:
an anode having an active material comprising silicon particles in the size of 100-500 nm, and boron carbide nanoparticles, wherein the boron carbide nanoparticles are at least one order of magnitude smaller than the silicon particles, wherein the weight percentage of the silicon particles is between about 4 to about 35 weight % of the total weight of the anode and the weight percentage of the boron carbide nanoparticles is between about 2.5 to about 25.6 weight % of the total weight of the anode;
a cathode; and
an electrolyte.

16. The lithium ion device of claim 15, wherein the silicon particles is coated on at least a region of its surface by some of the boron carbide nanoparticles.

17. The lithium ion device of claim 16, wherein at least some of silicon particles coated with the boron carbide nanoparticle are further coated with a film of at least one of: carbon and transition metal oxide.

18. A method for making an anode material for a lithium ion device, comprising:

forming an active material comprising silicon particles in the size of 100-500 nm, coated with boron carbide nanoparticles, wherein the boron carbide nanoparticles are at least one order of magnitude smaller than the silicon particles, and wherein the weight percentage of the silicon particles is between about 4 to about 35 weight % of the total weight of the anode material and the weight percentage of the boron carbide nanoparticles is between about 2.5 to about 25.6 weight % of the total weight of the active material.

19. The method of claim 18, further comprising coating the silicon particles with a film of at least one of: carbon and transition metal oxide.

20. The method of claim 18, wherein forming includes at least one of: high energy ball milling, spattering, chemical precipitation.

* * * * *